United States Patent Office 3,067,165
Patented Dec. 4, 1962

3,067,165
HEAT STABLE POLYMERIC COMPOSITIONS
Robert L. Hudson, Severna Park, Md., assignor to The Dow Chemical Company, Midland, Mich., a corporation of Delaware
No Drawing. Original application July 17, 1957, Ser. No. 672,352, now Patent No. 3,012,044, dated December 5, 1961. Divided and this application Mar. 29, 1961, Ser. No. 99,020
4 Claims. (Cl. 260—45.8)

This invention relates to heat stable polymeric compositions. More particularly, it relates to new heat stabilizers for chloroethylene polymeric materials.

This application is a division of U.S. Serial No. 672,352, filed July 17, 1957, now Patent No. 3,012,044.

Many polymeric materials, such as the haloethylene polymers, are known to be highly sensitive to the effects of elevated temperatures and under prolonged exposure to heat may become so degraded and discolored as to be commercially useless. It has been common practice to blend certain additives with the polymer to stabilize it against the degradative effects of heat. Those additives have consisted commonly of inorganic salts which were incompatible with the polymer prohibiting the production of transparent articles and were high melting or were organo-metallic compounds which were expensive and difficult to prepare and in some instances adversely affected the stability of the plasticizer or other elements that may be used in the formulation. Other disadvantages of many of the prior stabilizers were a high odor level and volatility. Any odor in the stabilizer will be transferred to the stabilizer composition. When volatile stabilizers are employed, they volatilize out of the composition leaving the composition in time unprotected against the degradative effects of elevated temperatures. A suitable heat stabilizer must meet other requirements. It must not impart a color to the formulation, it must be non-toxic, and it should be insoluble in water and the common household solvents. Additionally, many compounds are effective stabilizers but exude out of the fabricated article, destroying its appearance and leaving it unstabilized.

In the copending application of this inventor, U.S. Serial No. 581,382, filed April 30, 1956, now U.S. 2,918,-450, issued December 22, 1959, there are disclosed several glycidic esters having at least equal utility as thermal stabilizers for haloethylene polymers as any prior known organic heat stabilizers. However, even those did not represent a universal solution to the heat stabilizing problem.

In view of the above problems, it would be desirable to having and it is the principal object of this invention to provide a new group of thermally stable polymer compositions.

The above and related objects are achieved by means of a group of glycidic esters having the general formula:

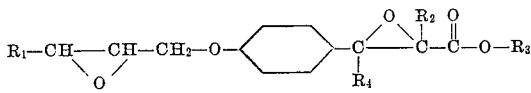

wherein $R_1$ and $R_2$ are independently selected from the group of hydrogen and alkyl, $R_3$ is alkyl, and $R_4$ is selected from hydrogen and aryl. The objects are further realized with compositions comprising these esters together with haloethylene polymers.

The new stabilizers contemplated in this invention are those falling within the scope of the above general formula. Although the ester group, $R_3$, may be any alkyl group or its equivalent, it is preferred when a stabilizing agent is desired to limit the size of the group to one of from 1 to 10 carbon atoms for economic reasons and for ease of preparation. Also, when $R_2$ is alkyl, it is preferred for practical reasons to have $R_2$ contain not more than 10 carbon atoms. It has been found that at least one of the substituents attached to the beta carbon atom must be an aryl group. When both of the groups attached to the beta carbon atom are groups other than aryl, a rearrangement of the ester apparently occurs under certain conditions, resulting in a product having no utility as a heat stabilizer for haloethylene polymers. Thus, $R_4$ may be hydrogen, aryl, or substituted aryl, such as tolyl, methoxyphenyl, or halophenyl, but cannot be alkyl since glycidic esters containing that substituent have no stabilizing effectiveness for haloethylene polymers.

As a preferred class of the new stabilizers exhibiting especially effective stabilizing tendencies are those wherein $R_2$ is alkyl and $R_4$ is hydrogen.

The preparation of the stabilizers will be illustrated by the procedure used in preparing methyl-3-(p-2,3-epoxypropoxyphenyl)-2-methylglycidate.

A solution of 3.0 moles of p-hydroxybenzaldehyde in 1500 milliliters of 2 N sodium hydroxide was added over a period of 3 hours to 9 moles of epichlorohydrin heated to 60° C. and the reaction mixture stirred for one hour longer at 60° C. The cooled reaction mixture was extracted with 500 milliliters of ethylene dichloride and the extracted fraction distilled under reduced pressure to remove solvent and excess epichlorohydrin. The residue was distilled to give p-2,3-epoxypropoxybenzaldehyde in 60% yield. The aldehyde was a solid melting at 37° C. and having a boiling point of 109–110° C. at 0.05 millimeter Hg.

To a mixture of 3.0 moles of p-2,3-epoxypropoxybenzaldehyde, 4.5 moles of methyl α-chloropropionate and 800 milliliters of anhydrous ether cooled in an ice bath was added 4.5 moles of anhydrous, powdered sodium methoxide at a rate that the temperature could be maintained between 7 and 15° C. After the addition was complete, the mixture was stirred for 68 hours at room temperature under a nitrogen atmosphere. Dilute acetic acid was added and the mixture extracted with ether. The dried ether solution was evaporated and the residue heated under reduced pressure to remove volatile material. The product was a light yellow oil in 68% yield and was identified by infrared absorption as methyl-3-(p-2,3-epoxypropoxyphenyl)-2-methyl glycidate. This material was distilled at 145–148° C. at 0.05 millimeter resulting in a colorless liquid exhibiting the same infrared spectrum.

These esters are effective stabilizers for polymers and copolymers which are subject to degradation and discoloration upon prolonged exposure to elevated temperatures. The haloethylene polymers composed of at least 50% by weight of vinylidene chloride are known to be especially sensitive to the degradative effects of heat, and, accordingly, these polymers are preferred subjects for stabilization.

The esters are effective stabilizers when employed in a concentration of from about 0.5 to 10% by weight based upon the weight of the polymer in the formulation. Compositions containing less than about 0.5% exhibit little more stability than unstabilized compositions. No additional benefit results from the use of more than 10%, and the cost and the physical properties, such as strength, which are dependent largely on the polymer suffer.

The esters may be blended with the polymer by any known formulating procedure, such as milling, dry blending, and similar procedures. In addition, the esters may be employed with the other additives which are commonly used in polymer formulations. Typical of those additives are pigments, dyes, fillers, light stabilizers, and other known heat stabilizers if desired.

The glycidic esters of this invention are colorless liquids allowing the production of white and pastel colored articles as well as transparent articles. The esters show greater stabilizing effectiveness toward compositions based upon haloethylene polymers than any previously known completely organic stabilizer. Because of their organic nature, they are capable of greater compatibility with the polymers than the inorganic or organo-metallic stabilizers. In addition, because of their exceptionally high boiling points, they do not volatilize out of the compositions and are more permanent than most stabilizers. The esters are odorless and show no tendency to exude from the fabricated articles when used in the expressed concentrations.

The effectiveness and advantages of the glycidic ester thermal stabilizers of this invention will be more apparent from the following illustrative example wherein all parts and percentages are by weight.

*Example*

Several samples were prepared from a basic formulation consisting of 92 parts of a copolymer prepared from 85% of vinylidene chloride and 15% of vinyl chloride, 3 parts of ethylphthalyl ethyl glycollate as a plasticizer and 2 parts of tertiary butylsalol as a light stabilizer. One of the samples was left as a blank. To one sample was added for comparative purposes 1 part of an epoxidized oil sold commercially as Paraplex G-60 by the Rohm and Haas Company. To another was added 3 parts of 1-(2-biphenyloxy)-2,3-epoxy-propane, a known heat stabilizer, also for comparative purposes. To another was added 3 parts of methyl-3-(p-2,3-epoxypropoxyphenyl)-2-methyl glycidate, the stabilizer of this invention. The samples were all evaluated according to a standard test. In that test a sample of at least 20 grams of the formulation is subjected to a temperature of 178° C. and the pressure of the evolved hydrohalide gas is used to determine the degree of thermal degradation. The results are relative to a standard and are reported as "T" values, which are the times required for the samples to reach a predetermined rate of pressure rise. Thus, a more thermally stable composition will exhibit a higher "T" value than a less stable composition. The results are listed in the following table.

Stabilizer:                 "T" value
 Methyl-3-(p-2,3-epoxypropoxyphenyl)-2-methyl
  glycidate _____ 24.4
For comparative purposes:
 None _____ 5.0
 Epoxidized oil _____ 10.0
 1-(2-biphenyloxy)-2,3-epoxypropane _____ 17.4

From the results it can be seen that the compositions of this invention show considerably greater stability than do those stabilized with prior known stabilizers.

Similar results are obtained when the glycidic esters are employed as stabilizers in compositions based on the polymer and copolymers of vinyl chloride.

What is claimed is:

1. A thermally stable thermoplastic composition comprising a haloethylene polymer and from 0.5 to 10% of the weight of said polymer of an ester having the general formula:

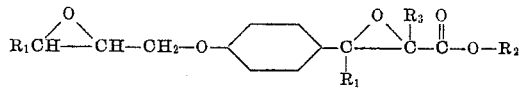

wherein $R_1$ and $R_2$ are independently selected from the group of hydrogen and alkyl, $R_3$ is alkyl, and $R_4$ is selected from the group of hydrogen and aryl.

2. The composition claimed in claim 1 wherein said ester is methyl-3-(p-2,3-epoxypropoxyphenyl)-2-methyl glycidate.

3. The composition claimed in claim 1 wherein said haloethylene polymer is composed of at least 50% by weight of vinylidene chloride recurring units.

4. The composition claimed in claim 3 wherein said haloethylene polymer is a copolymer of vinylidene chloride and vinyl chloride.

References Cited in the file of this patent
UNITED STATES PATENTS

| | | |
|---|---|---|
| 2,456,216 | Richter | Dec. 14, 1948 |
| 3,012,044 | Hudson | Dec. 5, 1961 |